United States Patent [19]
Goethel et al.

[11] Patent Number: 5,471,037
[45] Date of Patent: Nov. 28, 1995

[54] PROCESS FOR PREPARING POLYMERIC MATERIAL WITH MICROWAVE

[75] Inventors: Peter J. Goethel, Waynesboro, Va.; Richjard W. Lewis, Wilmington, Del.; Wilford J. Teerlink, Waynesboro, Va.

[73] Assignee: E. I. Du Pont de Nemours and Company, Wilmington, Del.

[21] Appl. No.: 931,742

[22] Filed: Aug. 18, 1992

[51] Int. Cl.$^6$ .................................................. H05B 6/78
[52] U.S. Cl. .......................... 219/750; 219/693; 219/695; 264/474; 264/489; 204/157.43
[58] Field of Search ................................. 219/750, 679, 219/690, 693, 695, 696, 697, 10.55 A, 10.55 F; 264/25, 26; 204/157.43

[56] References Cited

U.S. PATENT DOCUMENTS

| | | | |
|---|---|---|---|
| 3,461,261 | 8/1969 | Lewis et al. | 219/10.55 |
| 3,486,865 | 12/1969 | Furusawa et al. | 23/285 |
| 3,715,555 | 2/1973 | Johnson | 219/10.55 A |
| 4,144,434 | 3/1979 | Chiron et al. | 219/10.55 F |
| 4,276,462 | 6/1981 | Risman | 219/10.55 F |
| 4,424,301 | 1/1984 | Klippert et al. | 525/53 |
| 4,675,126 | 6/1987 | Unger et al. | 252/153 |
| 4,760,230 | 7/1988 | Hassler | 219/750 |
| 4,883,570 | 11/1989 | Efthimion et al. | 219/10.55 A |
| 5,069,928 | 12/1991 | Echizen et al. | 219/10.55 A |

OTHER PUBLICATIONS

Risman et al, "Theory For and Experiments With a $TM_{02n}$ Applicator" J. Microwave Power, 10(3), 271–280 (1975).

*Primary Examiner*—Philip H. Leung

[57] ABSTRACT

Process and apparatus, in which a stream of liquid reactants is heated in a resonant microwave cavity operating in a $TM_{0n0}$ mode and then provided with sufficient time in an annular plug flow reactor to complete the reaction results in improved time-temperature uniformity for all volume elements of the stream and are particularly suited for production of polyurethane prepolymer. A special cleaning method is provided for removing polymeric residues from the equipment with a solution of a monofunctional secondary amine in an organic solvent.

4 Claims, 7 Drawing Sheets

PROCESS FOR PREPARING POLYMERIC MATERIAL WITH MICROWAVE

BACKGROUND OF THE INVENTION

1. Field of the Invention

This invention relates to a process for producing polymeric material in which chemicals are mixed, heated and reacted to form a liquid stream of high viscosity. More particularly, the invention concerns an improvement in such a process wherein heat is supplied by microwave energy and the liquid stream of reactants is then passed through a vessel in plug flow such that substantially all volume elements of the stream are subjected to a uniform thermal history. The process is particularly suited for producing isocyanate-capped prepolymers that are used to make polyurethanes.

2. Description of the Prior Art

Chemical processes often require careful control of temperature and residence time of reactants to assure production of uniform products. It is particularly difficult to achieve uniform thermal histories when handling highly viscous liquid (e.g., liquid having a viscosity in a range of 1 to 10,000 poise). Typically, a highly viscous liquid passes through a pipe in laminar flow with a large velocity gradient between the wall and axis of the pipe. A volume element of stream near the wall requires several times as much time to pass through the pipe as does a volume element in the middle of the stream. Heating the stream from outside the pipe and through the pipe wall can add further thermal non-uniformities.

U.S. Pat. No. 3,461,261, Lewis et al, discloses resonant cavity microwave heating of materials such as threads, yarns and the like, axially disposed within an elongated cylindrical chamber. Resonant cavities with various transverse magnetic operating modes, including $TM_{02n}$ modes, are disclosed. However, the patent notes that transverse magnetic modes, such as $TM_{02n}$, are inferior to other modes because of problems of mode separation. Risman et al., J. Microwave Power, 10 (3), 271–280, (1975), also discloses microwave heating of materials by use of a cylindrical wave guide applicator. Many transverse magnetic operating modes are disclosed. The final paragraph of the article states, with regard to a $TM_{02n}$ mode, "Heating of high-viscosity liquids is another application of great practical interest . . . it may be possible to achieve very even temperature profiles over the tube cross-section and thus very mild and rapid heat treatment. Further analysis is, however, required to verify this." No data are given to show that the possibility is actually achievable or how to do so.

Plug-flow reactors have been suggested for decreasing thermal history non-uniformities in liquid streams of chemical processes. For example, U.S. Pat. No. 3,486,865, Furusawa et al, discloses a plug-flow reactor having longitudinal and transverse stirring vanes and several compartments separated by transverse, preferably foraminous, rotating partitions. U.S. Pat. No. 4,424,301, Klippert et al, discloses a series of plug-flow reactors, one vertical and two inclined about 20 degrees to the horizontal. Reactors having multiple complicated horizontal members are difficult to clean especially if the reactors have been used for processing polymeric materials. Further, neither Furasawa et al nor Klippert et al discloses plug-flow reactors that can have a constant residence time with different throughputs.

The use of solutions of monofunctional amines in methylene chloride to clean apparatus used for the preparation of polyurethane sealants is disclosed in U.S. Pat. No. 4,675,126, Unger et al. However, the present inventors found that such solutions do not adequately clean equipment used for preparing spandex prepolymer.

A purpose of this invention is to provide a continuous process for making polymeric materials which subjects all volume elements in a viscous stream to substantially the same uniform history of temperature and residence time.

SUMMARY OF THE INVENTION

The present invention provides an improved process for making polymeric material. The invention also provides a novel microwave heating apparatus and a novel plug-flow reactor for use in the process, as well as a convenient process for cleaning the microwave heating apparatus and plug-flow reactor.

The process of the present invention is of the type that comprises mixing reactants, optionally in the presence of solvent, to form a liquid reactant stream, heating the stream and providing sufficient reaction time to form a polymeric product. The improvement of the process of present invention comprises:

rapidly heating the reactant stream in a microwave resonant cavity operating with microwave energy supplied in a $TM_{0n0}$ mode, preferably a $TM_{020}$ mode, with minimum heating at radial boundaries of the stream; and continuing the reaction as the stream advances substantially in plug flow through an annular zone of a volume controlled to provide a total residence time from the time the reactant stream enters the microwave cavity until the time product is removed from the annular zone that is constant and independent of mass-flow, preferably over a two-fold range.

In a particularly preferred embodiment of the process of the invention, the reactants are a substantially linear polymeric diol and an organic diisocyanate, the reactants are heated in the microwave cavity to a temperature in the range of 50° to 75° C. and then passed through the annular zone with a constant residence time in the range of 1 to 2½ hours, during which time the stream temperature rises to a temperature in the range of 80° to 100° C. and isocyanate-capped glycol is formed.

The present invention also provides an improved resonant cavity microwave heating apparatus of the type that comprises an elongated cylindrical chamber having a wave guide coupled thereto for propagating a microwave field through an iris in the wall of the cylindrical chamber and for maintaining a pre-selected resonance mode and means for passing material to be heated through the chamber. The improved apparatus of the invention further comprises the wave guide being equipped with a wave guide impedance-matching coupler, preferably four-stub tuner, and an inductively coupled iris for producing a $TM_{0n0}$ mode. A preferred embodiment of the microwave heating apparatus has multiple irises, wave guides and couplers located at different radial and axial positions along the chamber.

The present invention also provides a novel, stirred, plug-flow reactor comprising a vertical outer cylindrical shell and an inner cylinder coaxial therewith, the inside surface of the outer shell and the outside surface of the inner cylinder forming an annular path, the shell having an inner radius in the range of 4 to 8 times the outer radius of the inner cylinder, an inlet at the top of the reactor for feeding viscous liquid into the annular path, a rotatable stirrer located inside and coaxial with the shell having blades extending vertically along the length of the reactor and being closely spaced from the inner wall of the shell, usually by no more than 0.30 centimeters, and extending radially across 35% to 80% of the thickness of the annular path, means connected to the reactor, for use during operation, for sensing the quantity of liquid in the reactor and for adjusting the quantity of liquid therein to be in proportion to liquid flow through the reactor thereby providing a predetermined constant residence time for the liquid flow through the reactor, and an outlet with means for removing liquid from the reactor.

In a preferred apparatus of the invention, the inlet at the top of the reactor comprises an inlet pipe and a coaxial rod that form an inlet annulus of 1 to 1.5 cm thickness, the rod being connected to the top of the inner cylinder, the top of the inner cylinder being shaped to allow viscous liquid from the inlet annulus to flow as a film down the shaped surface of the inner cylinder into the annular path.

The invention further provides a convenient process for cleaning polymeric deposits from equipment in which a substantially linear polymeric diol had been reacted with an organic diisocyanate to form an isocyanate-capped glycol, suitable for chain extension to form polyurethane. The cleaning process comprises contacting the deposits with a 0.5 to 15 weight percent solution of a monofunctional secondary amine in a solvent, the solvent being N,N-dimethylacetamide, N,N-dimethylformamide or N-methyl-2-pyrrolidone. Preferably, the monofunctional secondary amine is di-n-butylamine, the solvent is N,N-dimethylacetamide, the weight percent of di-n-butylamine in the solution is in the range of 4 to 10% and the solution is heated to a temperature in the range of 40° to 60° C.

BRIEF DESCRIPTION OF THE DRAWINGS

The invention will be better understood by reference to the attached drawings, in which.

DETAILED DESCRIPTION OF PREFERRED EMBODIMENTS

The following descriptions of preferred embodiments are intended to illustrate the invention, but not limit its scope. The scope of the invention is defined by the appended claims.

Figure 1:
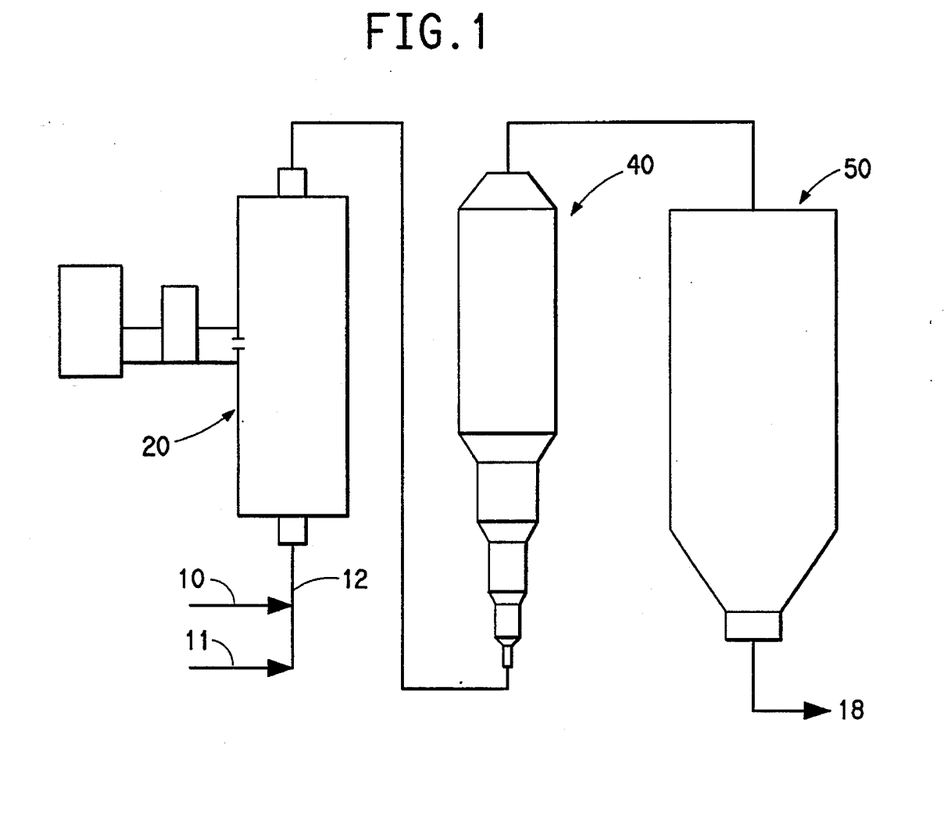
FIG. 1 is a schematic flow sheet for a process of the invention, depicting mixed reactant stream 12 being passed in succession through microwave heater 20, optional static mixer 40 and annular plug flow reactor 50.

In accordance with the process of the present invention, as illustrated in FIG. 1, reactants 10 and 11, with or without solvent, are metered and mixed to form stream 12 which is forwarded in sequence through microwave heating apparatus 20, optional static mixer 40, and annular stirred plug-flow reactor 50 to form polymeric stream 18. Microwave heating apparatus 20 uniformly heats stream 12 in a microwave resonant cavity which is operated in the $TM_{0n0}$ mode. The stream is then advanced through the remainder of the process in a way that approaches ideal "plug flow" so that all volume elements of the stream experience nearly identical time-temperature histories. Plug-flow reactor 50 is adapted to control the residence time to be substantially independent of throughput over a fairly wide range of throughputs (e.g., about a two-fold range). The heater, static mixer and plug-flow reactor may be operated in series, as just described, or independently of each other.

Figure 2:
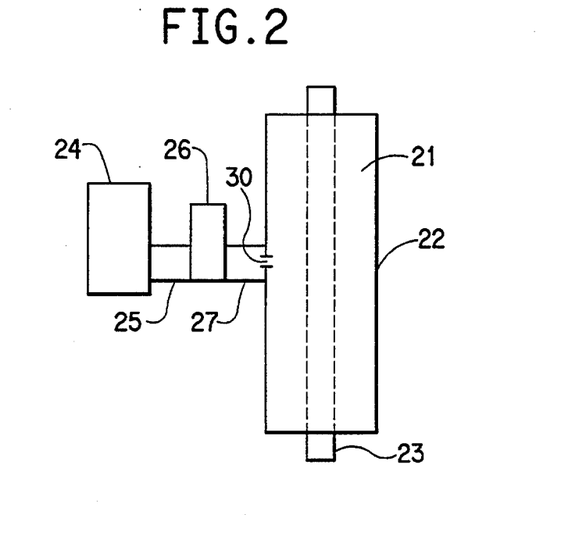
FIG. 2 is a more detailed representation of microwave heating apparatus 20.

As shown in FIG. 2, the microwave heater has a resonant cavity 21 inside aluminum outer tube 22. Coaxial with and inside aluminum tube 22 is microwave-transparent tube 23, through which reactant stream 12 passes. In operation, the stream is heated with microwave energy supplied from continuous wave magnetron power source 24. The power source is coupled to the resonant cavity by wave guide section 25, wave guide impedance-matching coupler 26 (e.g., a four-stub tuner), wave guide extension 27 and iris 30 in succession. The microwave energy is supplied to produce a $TM_{0n0}$ mode to the axial cylindrical load (i.e., reactant stream 12 within tube 23). Other modes in the $TM_{0n0}$ series can serve to produce minimum heating of the load at the tube wall liquid boundary. However, the $TM_{020}$ mode is preferred because it can be produced with the smallest diameter of outer shell.

Figure 5:
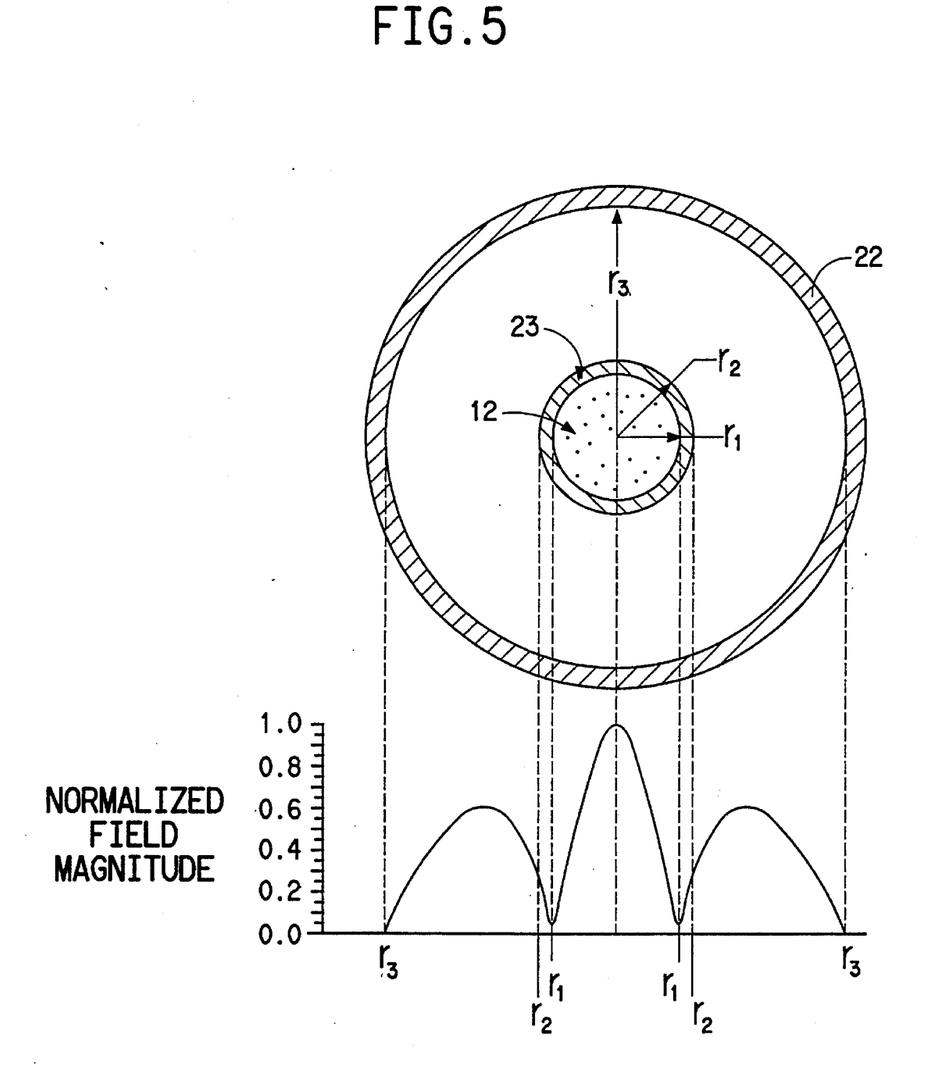
FIG. 5 is a graph of normalized microwave energy field in the microwave heater plotted as a function of resonant cavity radius, from center of glass tube 23 to the inside radius of aluminum outer tube 22.

The relative magnitude of the microwave field is shown as a function of heater radius in FIG. 5. As a result of the field distribution, the inner wall of tube 23 is heated very little. Microwave heater 20 is designed to maximize coupling of the microwave generator operating frequency to the reactant stream being heated. Microwave power is adjusted to provide sufficient energy to heat the reactant stream to a desired temperature.

Wave guide coupler 26 with inductively coupled iris 30 suppresses high reflected energy levels which would otherwise greatly increase uneven heating, particularly in the region near the iris. The residence time of reactant stream 12 in microwave heater 20 usually is very much shorter than the residence time required in the rest of the process. For example, in a preferred process of the invention wherein an organic diisocyanate is reacted with a polymeric diol to form isocyanate-capped prepolymer suitable for use in producing polyurethanes, the mixed reactants stream can be heated in the microwave apparatus in less than about a minute, while the remainder of the reaction may require a hundred times as much time.

Figures 3, 4:
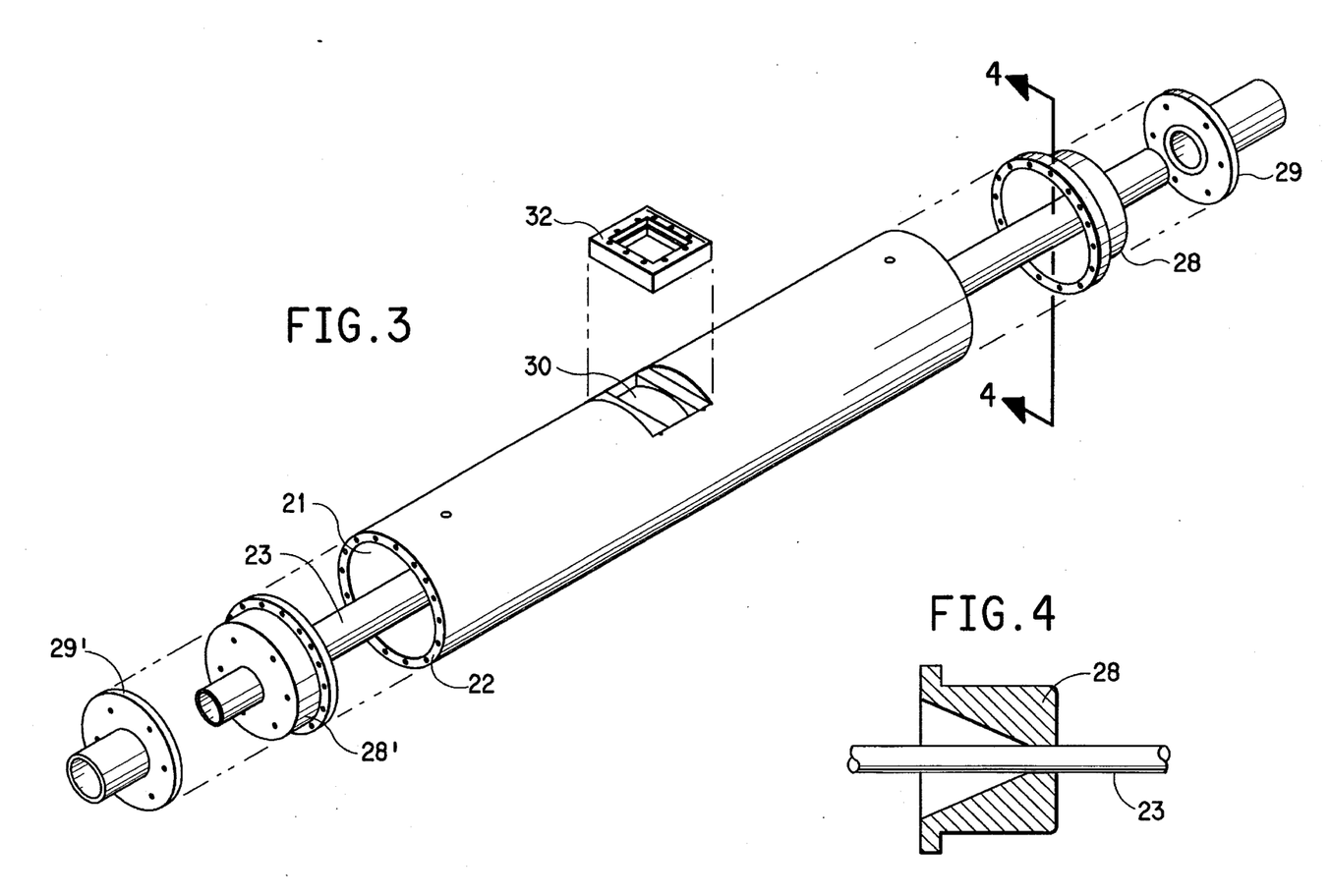
FIG. 3 is an isometric representation of partially disassembled microwave heating apparatus 20 showing iris 30 located in cylinder 22 outside cavity 21.
FIG. 4 is a cross-section of end cap 28 of microwave heating apparatus 20.

As shown in FIG. 3, an isometric representation of partially disassembled microwave heating apparatus 20, iris 30 is located midway along the length of cylindrical cavity 21. Adapter 32 is a connector for attaching wave guide extension 27 to tube 22 at iris 30. Flanges 29, 29', in cooperation with end caps 28, 28', axially center tube 23 within cavity 21 and prevent microwave leakage. Each of the end caps, which are shown in cross-section in FIG. 4, have a conical inner surface that suppresses arcing at the ends of cavity 21. Glass, which is microwave-transparent, is suitable for tube 23 of the microwave heater. Such glass is available commercially (e.g., "Kimax" sold by Kimble Glass, Inc., Vineland, N.J.).

The inductive iris 30 is usually located at least three inches from each end of tube 23. If desired, a cool stream of air or nitrogen can be supplied to the resonant cavity, outside the glass tube. It has been found that even when the heater is operated in the $TM_{020}$ mode, after long periods of operation, polymeric residue can accumulate on the inner wall of the tube, particularly in the area opposite the iris. This is believed to be due to a minor perturbation in the electric field, which causes a local "hot spot". To diminish the intensity of such a hot spot, more than one microwave source, wave guide coupler and iris can be connected to the resonant cavity, with the total combined power of the sources being the same as that required for the single source. When such multiple sources, couplers and irises are employed, the amount of polymeric residue build-up on the opposite wall can be reduced sufficiently to permit the operating time between cleanings of the tube to be at least doubled. Of course, a single power source can be used to provide energy to several tuners and irises. Preferably, multiple irises are separated radially and axially from each other. For example, if one power source is employed with multiple irises, the first iris is at an arbitrary 0 degree position and 15 cm from the inlet to the cavity, a second iris could be located at a 30-degree position and 45 cm from the inlet, a third iris could be located at a 60-degree position and 75 cm from the inlet, and so forth. If multiple power sources are employed with multiple irises, the fields from each source must be shielded from each other. For this purpose, annular aluminum discs can be attached to tube 23 to extend across the cavity to outer tube 22 to separate the fields.

Outer tube 22 of the resonant cavity can be of heavy gauge aluminum. Optionally, tube 22 may be split and hinged lengthwise for convenient access to the interior of the cavity 21. The diameter and thickness of tube 23 are selected to be commensurate with the temperature, pressure and flow conditions required for heating the reactant stream. Large differences in reactant streams, heat loads and flow rates require different combinations of tube dimensions, microwave frequencies, power ratings, etc. These parameters can be determined empirically or by calculational methods. For example, when one knows (a) the complex microwave refractive indices of reactant stream 12 and tube 23, (b) the desired wall thickness of tube 23, and (c) the desired center resonant frequency, then the inner diameters of tube 23 and resonant cavity aluminum tube 22 and the bandwidth needed to support resonance can be determined by use of the equations of Risman & Ohlsson and/or numerical computer techniques. However, note that for improved accuracy, the microwave refractive index of the tube 23, which Risman and Ohlsson omit from their computations, must be included in the calculations.

As shown in FIG. 5, heater 20 provides a microwave energy intensity profile across flowing reactant stream 12, that approximates the laminar flow velocity profile of the stream along the length of tube 23. Thus, the heater provides a nearly flat temperature profile across the diameter of tube 23 and minimizes exposure of slower moving layers of liquid at the walls of tube 23 to high temperatures. Usually, the temperature to which the reactant stream is heated is that required to initiate the desired reaction and the energy input of the heater is adjusted to provide the same temperature for all mass throughputs.

In some instances, it may be desirable to have more than minimal energy input at the inner wall of the glass tube. In such instances, the dimensions of the tubes can be altered to increase the energy input at the glass wall.

Figure 6:
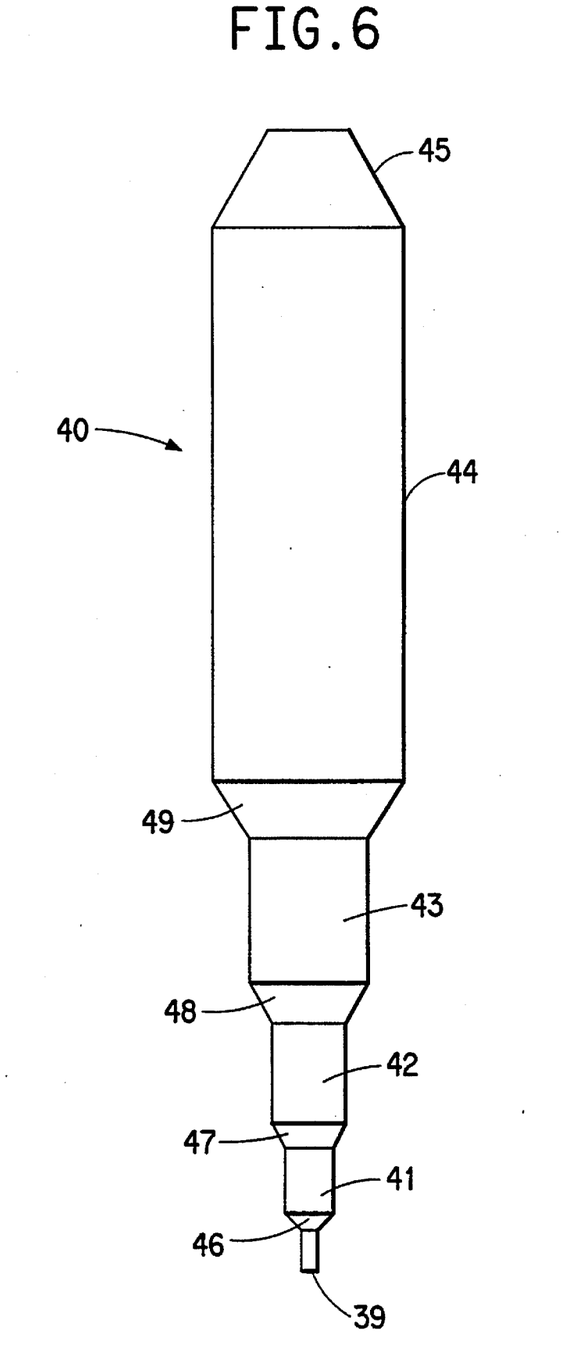
FIG. 6 is a side view of optional static mixer 40 comprising a stack of four conventional static mixers 41, 42, 43 and 44 of generally cylindrical cross-section, each of larger diameter than the preceding one.

Usually, in the processes of the present invention, reactant stream 12, because of its high viscosity, exits from microwave heater 20 in laminar flow. In the embodiment of the invention illustrated in FIG. 1, reactant stream 12 flows from the top of heater 20 to the base of optional static mixer 40. In mixer 40, the laminar flow is converted into plug flow via extensive radial mixing that occurs in a series of static mixer sections. As shown in FIG. 6, stream 12 enters through pipe 39 and then passes through four cylindrical static mixer sections 41, 42, 43 and 44. The diameter of each succeeding mixer section is larger than the preceding mixer section. Various static mixer sections suitable for use in the process of the present invention are commercially available (e.g., "SMX" mixers from Koch Engineering Co., New York, N.Y.). Each mixer section is entered through a frusto-conical connector piece 46, 47, 48 and 49. The diameter of last mixer section 44 can be as much as five times or greater than the diameter of first mixer section 41. The reactant stream exits the top of mixer 40 through frusto-conical reducing section 45. The frusto-conical enlarging and reducing sections are sufficiently long to avoid flow "dead spots" and excessive turbulence. The residence time of the reactant stream in optional static mixer 40 is set by the flow rate of the stream and the overall volume of the mixer.

In a preferred process of the invention wherein a polyurethane prepolymer is made from a reactant stream of an organic diisocyanate and a polymeric glycol, the optional static mixer can provide as much as half the total residence time in the system. During passage through the static mixer the reactants are partially reacted and the viscosity of the stream increases significantly (e.g., from 1 poise or less to 2,000 poise or more).

Rather than pass through optional static mixer 40 and then to reactor 50, reactant stream 12 can proceed directly from heater 20 to reactor 50. The purpose of reactor 50 is to provide sufficient and equal residence time for each volume element of reactant stream to permit completion of the desired reaction, regardless of total throughput, within about a factor of two. Heated reactant stream 12 is forwarded in plug flow through the main body of reactor 50. The reactor is provided with means for adjusting the volume of reactant stream in the reactor so that the total residence time of the stream in the system between the entrance to the microwave heater and the exit of the reactor, is kept constant, even if reactant throughput differs by as much as a factor of two. Reactant volume in the reactor can be controlled by adjusting the liquid level (i.e., height of liquid reactant) in the reactor. Usually, the reactor provides at least about 50% of the total holdup volume of the system. If the optional static mixer is omitted, the reactor can provide as much as 99% of total volume of the system from the entrance to heater 20 to the exit of reactor 50.

Figure 7:
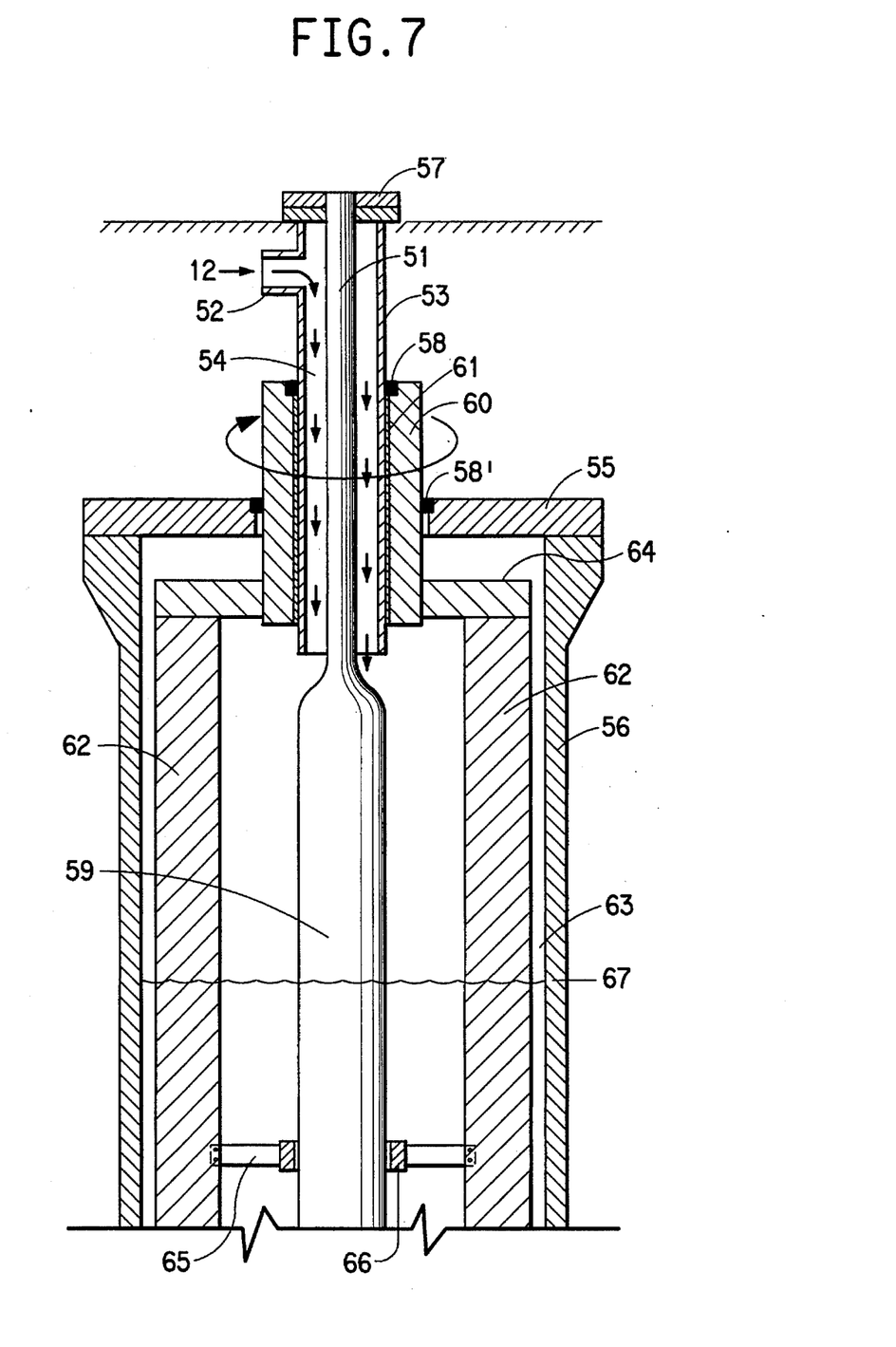
FIG. 7 and FIG. 8 are respectively schematic vertical cross-sections of the upper and lower portions of annular plug-flow reactor 50.
Figure 8:
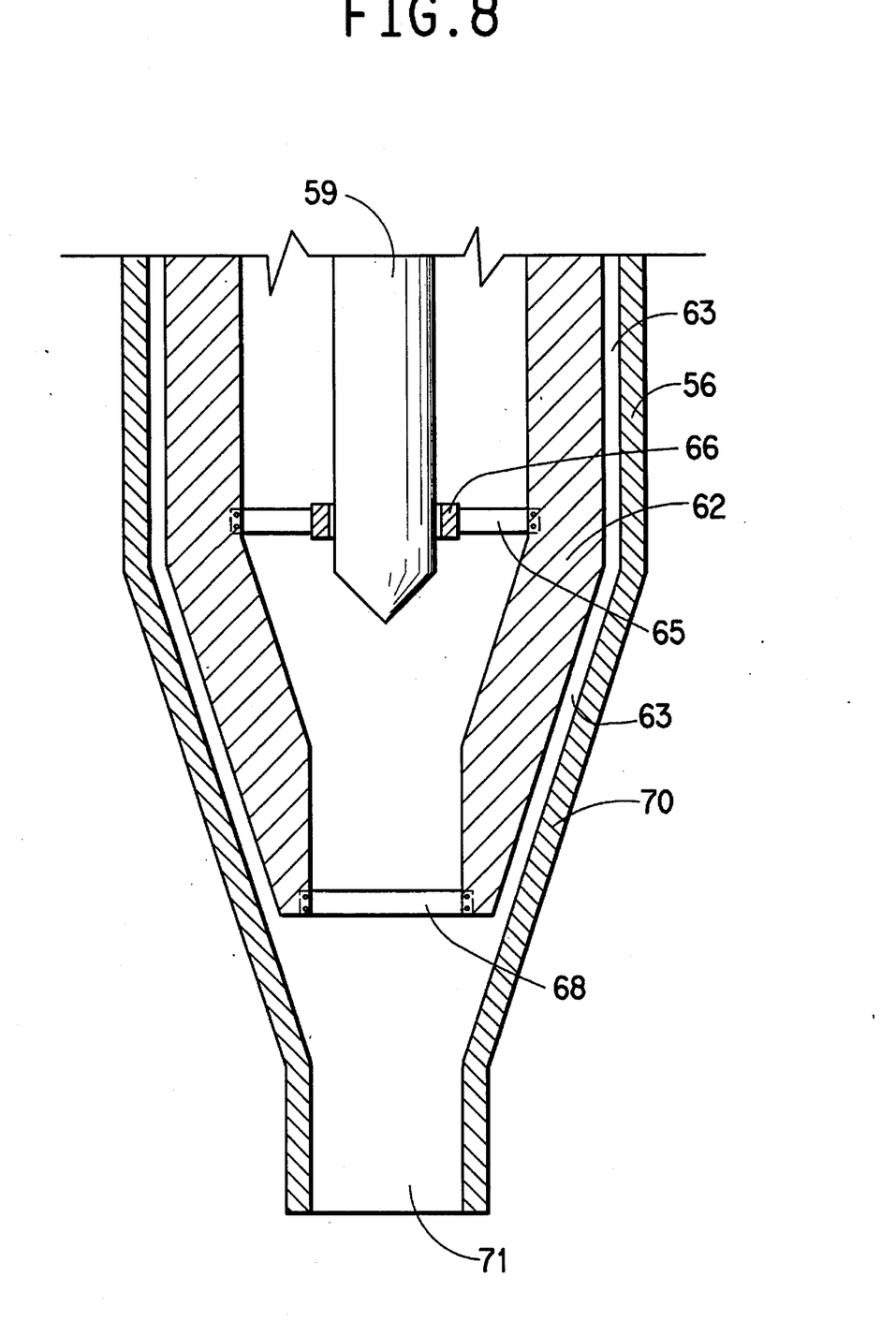
Figure 9:
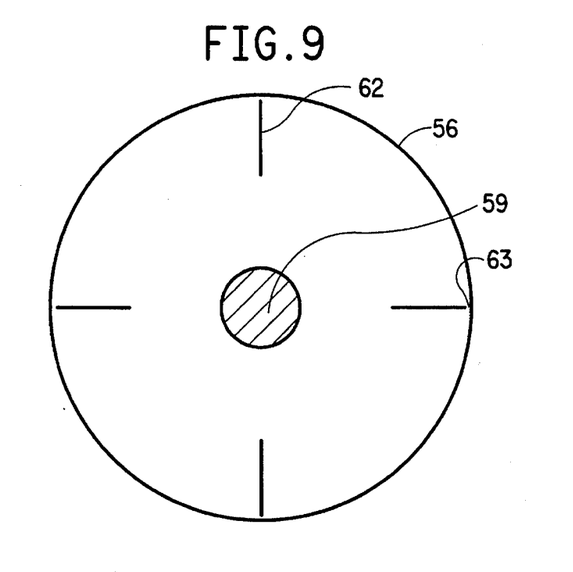
FIG. 9 is a simplified horizontal cross-sectional view taken at about the mid-height of plug-flow reactor 50.

FIGS. 7 and 8, respectively, schematic vertical cross-sections of the upper and lower portions of reactor 50 and FIG. 9, a horizontal cross-section of the reactor, illustrate the main features of the reactor. Heated reactant stream 12 enters the reactor through port 52 of inlet pipe 53. The stream flows downward into annulus 54 formed by the inside diameter of pipe 53 and the outside diameter of support rod 51. Support rod 51, which is located on the axis of reactor 50, is stationary and is attached to cap 57 at the top of pipe 53. The bottom of rod 51 is attached to the shaped top portion of stationary coaxial cylinder 59. The dimensions of annulus 54 are set from knowledge of the viscosity and flow rate of stream 12 to assure that the stream, as it leaves the annulus, flows as a film across the shaped top and upper surface of cylinder 59 until it reaches the surface 67 of the liquid in the reactor. Generally, an annulus thickness in the range of 1 to 1.5 cm is practicable. The height of liquid surface 67 is controlled to provide constant residence time for different flow rates.

The main body of reactor 50 usually comprises cylindrical shell 56 attached to frusto-conical outlet section 70. Generally, the ratio of reactor height to diameter (inside dimensions) is greater than 6 and less than about 15. Preferably, the ratio is in the range of 8 to 12. In operation, the reactor usually is between 30 and 90% full. The inner diameter of cylindrical shell 56 is usually in the range of 4 to 8 times, preferably 5 to 7 times, the outer diameter of stationary cylinder 59. Cylinder 59 extends along substantially the entire axis of reactor 50. Shell 56 and cylinder 59 form an annular flow path from the top of the reactor to the lower end of cylinder 59. After passage through the annular path, the reactant stream enters the frusto-conical lower end 70 of the reactor to exit through outlet port 71.

Annular plug-flow reactor 50 has a stirrer comprising multiple (e.g., four) blades 62, suspended vertically from the top by support structure 64 and reinforced by spokes 65 and rings 66 at several levels along their length and ring 68 at their bottom. Reinforcing struts (not shown) that interfere minimally with stream flow patterns also can be used to strengthen the stirrer. Preferably, blades 62 have zero pitch and are radially equally spaced from each other. The clearance 63 between the blade outer edge and the reactor inner diameter (i.e., inner diameter of cylindrical shell 56 and conical bottom section 70) is sufficiently small, usually no greater than about 0.3 cm (0.12 inch), to provide wiping of the shell inner surface during operation. In the cylindrical part of reactor 50, blades 62, separated from inside of shell 56 by clearance 63, extend inwardly across 35 to 80 percent of the width of the annular path created by shell 56 and cylinder 59. Preferably, the blades extend about half way across the width of the annular path.

The blades are rotated by tubular drive shaft 60 which is driven by a conventional motor and gear box (not shown). Drive shaft 60 contains internal sleeve bearing 61 which surrounds inlet pipe 53. The drive shaft extends through reactor lid 55 and is attached to blade support structure 64. Conventional seals 58 and 58' prevent leakage through the drive shaft and lid, respectively.

In operation, the blades rotate slowly with an average radial velocity that is about 5 to 15 times the vertical velocity of the reactant stream through the reactor; about ten times the vertical velocity is preferred. The blade rotation promotes radial mixing in the horizontal plane with little or no axial mixing, thereby providing the reactant stream with a flow pattern that closely approaches plug flow.

The above-described equipment for carrying out the process of the invention, operates well when the viscosity of the streams is at least one poise, but much higher viscosities, up to several thousand or more, being preferred. Usually, the heater, the optional static mixer and the plug-flow reactor are operated in a vertical position. The vertical position permits easy draining and simplifies any cleaning procedure that periodically may be necessary.

To control the temperature of the reactant mixture, heating, cooling, and/or insulation may be applied to the pipelines, mixers and reactors. Heaters may be used to heat the system to a desired operating temperature prior to startup, and then turned off shortly before or after the process is started. To prevent thermal excursions, safety features may be installed, such as flow, microwave and thermal sensors which provide feedback to the microwave power system. As will also be apparent to those skilled in the art, appropriate pumps, pipelines, sensors, and controllers may be used to properly monitor and adjust flow rates, fluid levels, and the like.

The above-described process is especially suited for preparing polymeric materials, such as polyurethane prepolymers that are formed by reaction between a linear polymeric glycol and an organic diisocyanate, as illustrated in the Examples below. When used for such purpose, from time to time it becomes necessary to clean the apparatus of organic residues (often referred to hereinafter as "gel") that formed during operation of the process. We have found that solutions of secondary amines in amide solvents are unexpectedly efficient as cleaners for such gel. Generally, the solutions are 0.5–15%, preferably 5–10%, amines by weight. Monofunctional aliphatic secondary amines are most preferred. Low cost, low toxicity, high flash point (above about 40° C.), and good solubility in the solvent are desirable. The best balance of these characteristics is provided by di-n-butylamine (DBA), which is preferred. Dimethylacetamide (DMAc), dimethylformamide (DMF), and N-methyl-2-pyrrolidone (NMP) are preferred solvents. The solutions can be warmed above ambient temperature (e.g., to about 50° C.) to speed the cleaning. Agitation or pumping of the solutions at a rapid rate in the equipment also can accelerate the cleaning. After cleaning, the equipment can be rinsed with amide solvent and then dried.

The invention is further illustrated by the following examples of preferred embodiments in which the invention is used in the preparation of isocyanate-capped prepolymer intended for use in making polyurethanes, particularly spandex. Methods for preparing such polymers are well-known, as for example from U.S. Pat. Nos. 2,929,804, 3,097,192, 3,428,711, 3,533,290, 3,555,115 and 3,557,044, among others. In these known methods, hydroxyl-terminated linear polymer, such as polyether glycol, polyester glycol, polycarbonate glycol, or the like, is reacted with organic diisocyanate to form an isocyanate-capped glycol (i.e., prepolymer), such as can be made by the process of the present invention. The resulting "capped glycol" prepolymer is then chain-extended with an agent having two active hydrogen atoms in a polar aprotic solvent, such as dimethylacetamide (DMAc) to form a solution of the desired polyurethane. The thusly formed solutions are useful for making fibers, films, coatings, foams, and molded articles by conventional means.

The following examples are included for the purposes of illustration and are not intended to limit the scope of the invention, which scope is defined by the appended claims. In the examples, measured values of several parameters are given. Isocyanate moiety content of capped glycol product, is determined by the method of S. Siggia, "Quantitative Organic Analysis via Functional Group" 3rd Edition, Wiley & Sons, New York, p 559–561 (1963). The viscosity of capped glycol product is determined at 40° C. by ASTM D1343–69 (with a Model DV-8 Falling Ball Viscometer sold by Duratech Corp., Waynesboro, Va.). Stream viscosity is measured on stream samples immediately after being removed from the stream, with a Brookfield Viscometer operating at the stream temperature. Complex microwave refractive index is measured by the method of Metaxas and Meredith, "Industrial Microwave Heating", Chapter 3, volume 4 of IEE Power Engineering Series (eds. Johns, Ratcliff and Platts, Perigrinus Ltd., 1983).

EXAMPLE 1

This Example illustrates the present invention according to the flow sheet of FIG. 1 with a process wherein 4,4'-diphenylmethane diisocyanate is reacted with polytetramethyleneether glycol of 1800 molecular weight. The glycol and the diisocyanate are each preheated to 48° C. and then metered and mixed thoroughly in less than one minute. No significant reaction occurred under these conditions. The resulting reactant stream, which was 18.5% diisocyanate by weight, was then fed to microwave resonant cavity heater 20.

The reactant stream had a complex microwave refractive index of $\sqrt{3.73+0.62i}$. The glass tube has a microwave refractive index of $\sqrt{3.73+0.0004i}$, a wall thickness of 0.434 cm (0.171 inch) and a length of 112 cm (44 inch). The resonant cavity tube had a 19.0-cm (7.5 inch) outer diameter and a 91.4-cm (36-inch) length. Microwave energy with a center frequency of 2,450 MHz was applied by a 6 KW power source (sold by Muegge Electronics GMBh of Reichelsheim, Germany). A YJ1600 magnetron tube (sold by Richardson Electronics, Ltd., of LaFox, Ill.), was used with a model WR340 wave guide (sold by Space Machine & Engineering Corp., of St. Petersburg, Fla.), a model GL408 four-stub tuner (sold by Gerling Labs of Modesto, Calif.), and an inductive iris. The inner diameters of the glass tube and the resonant cavity were 5.016 cm (1.975 inch) and 16.502 cm (6.497 inch) respectively. Bandwidth was 134 MHz.

The microwave power was set at 4.05 kilowatts. The exterior surface of the glass tube was maintained at less than 67° C. (as measured by an infrared probe, sold by Omega Engineering of Stamford, Connecticut) by a flow of about 450 to about 600 liters per minute of air at a temperature of between 5° and 15° C. through the microwave resonant cavity. The reactant stream had a less-than-½-minute residence time in the microwave heating zone and exited therefrom at a temperature of 58° C.

The heated stream then flowed to the optional static mixer, which was preheated to 75° C. with steam tracing lines on the outside wall of the mixer. After flow of the reactant stream to the static mixer started, the steam heating was stopped. In this example, two Koch "SMX" static mixer elements of 6.4-cm (2.5-inch) diameter are followed in succession by two such elements of 10.2-cm (4.0-inch) diameter, two elements of 20.3-cm (8.0-inch) diameter, and finally nine elements of 30.5-cm (12.0-inch) diameter. The residence time in the static mixer was about ½ hour. At steady state, the temperature of the exiting reactant stream was about 85° C. In passing through the static mixer, the Brookfield viscosity of the stream increased from about 5 to 80 poise, measured at 58° and 85° C., respectively.

From the static mixer, the solution passed to the annular plug-flow reactor. The reactor was of stainless steel. The reactor had a 50.7-cm (23.5-inch) inner diameter, a 3.35-m (11-ft) height and a 1.07-m (3.5-ft) long frusto-conical section at the bottom, which reduced the inner diameter of the reactor to 15.2 cm (6.0 inch) at the reactor outlet. The stationary cylinder had a diameter of 10.2 cm (4.0 in). The reactor was equipped with four vertical stirring blades, spaced 90 degrees apart. Each blade was 13-cm (5.0-inch) wide. Blade-to-wall clearance was 0.20 cm (0.08 inch).

The plug-flow reactor was blanketed internally with dry nitrogen. The outside of the cylindrical shell and the bottom conical section were jacketed with low intensity electrical resistance heaters and insulation. The reactor lid also was insulated. The resistance heaters were used to heat the reactor to 90° C. prior to startup. After startup, heating was discontinued. The blades were rotated at 2 rotations per minute. The reactor was maintained about ¾ full, which at the stream flow rate provided about a 1½ hour residence time. The resultant capped glycol stream exited from the reactor at a temperature of 95° C. and then was rapidly cooled to 49° C. The viscosity of the capped glycol stream was about 830 poise.

The isocyanate content of the product capped glycol stream was measured with an on-line infra-red analyzer. The minute-to-minute standard deviation of the isocyanate content of the capped glycol made by the process was less than ⅔ the standard deviation of the isocyanate content of such prepolymer made in conventional commercial pipeline reactor.

The product was then further reacted with ethylenediamine chain extender and diethylamine chain terminator to form a polymer from which elastic filaments were dry-spun by conventional methods. The spandex made with prepolymer of the process of this invention resulted in as much as 30% less fiber waste than was usually produced with spandex produced with prepolymer prepared by conventional methods.

EXAMPLE 2

This example demonstrates how well the equipment of the present invention approaches plug flow. The same equipment as was used in Example 1 was employed in this example.

Figure 10:
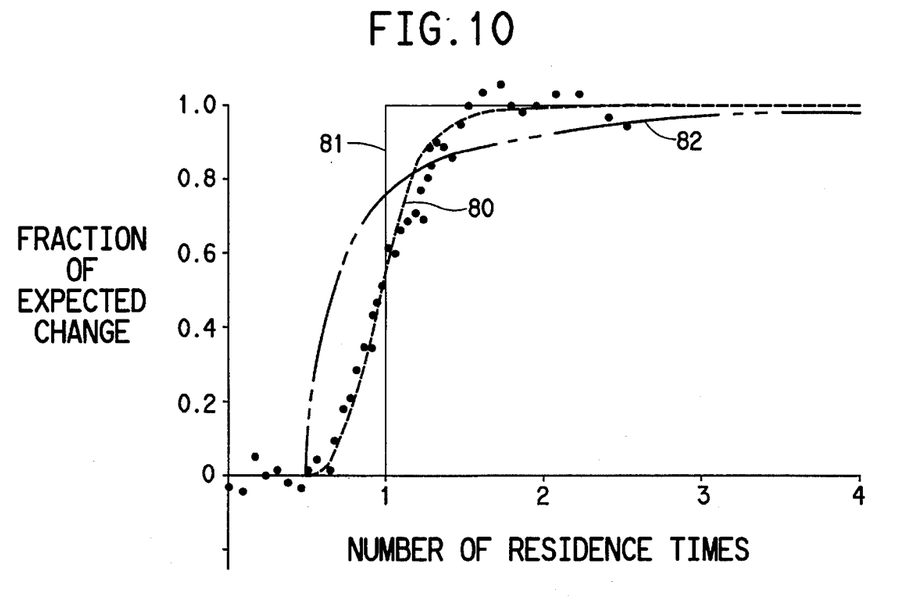
FIG. 10, a graph of the effect of a step change in a process variable as a function of time, compares the theoretically expected effects of such a step change for a stream 81 in perfect plug flow, a stream 82 in ideal laminar flow and an actual stream 80 (from data in the Example below).

The steady-state operating conditions of Example 1 were re-established in the equipment. Then, a 3.4% step-change was made in the amount of diisocyanate reactant supplied to the system. The resulting change in percent isocyanate content (% NCO) in the capped glycol product was monitored as a function of time. The results are presented in FIG. 10, wherein the vertical axis is the measured change in % NCO in the capped product, expressed as a fraction of the total change expected to result from the step-change in the isocyanate feed rate. Curve 80 was fitted to the data. The theoretical optimum laminar flow curve 82 was calculated from the equations in Chapter 13 (Section 13.4.5, p 659, "Laminar Flow Reactor") of "Elements of Chemical Reaction Engineering", ed. H. Scott Fogler, Prentice-Hall (1986). Ideal plug flow would create a vertical step-change, as shown by 81 at one residence time. The data demonstrate that the equipment of the present invention provides considerable improvement away from the best possible laminar flow and toward ideal plug flow.

EXAMPLE 3

This example illustrates the cleaning process of the present invention.

A series of tests were run to determine the ability of solutions of a monofunctional secondary amine to dissolve polymeric deposits formed in equipment used to make capped glycol. Cleaning solutions of di-n-butylamine (DBA) in different organic solvents were employed. The test procedure was as follows. Samples of organic deposits ("gel") were removed from a reactor that had been used for preparing capped glycol of the composition formed in Example 1. The samples were stored at room temperature in capped glycol under a dry nitrogen atmosphere. For the tests, a large piece of gel sample was removed from the capped glycol, rinsed in N,N-dimethylacetamide (DMAc) to remove soluble material, patted dry with a paper towel and then cut into pieces of about 2-grams weight. Each cut sample was placed in a 150-cm3 glass jar. Then, 50 grams of a 5 weight percent solution of DBA in an organic solvent was added to the jar. The jar was sealed. Its contents were maintained at a temperature of 26° C. and stirred with a magnetic stirrer operating at 100 rpm. A group of different solutions were tested.

The test results are summarized in the table below. In tests 1, 2 and 3, solutions of DBA in an amide solvent according to the invention were employed. Tests a, b, c, d and e were comparative tests in which the DBA solutions were made in solvents outside the invention. In the Table, DMSO is dimethylsulfoxide, $CH_2Cl_2$ is methylene chloride, iPrOH is isopropanol, and MeOH is methanol.

| Test | Solvent | Results |
|------|---------|---------|
| 1 | DMF | Gel dissolved in 4.6 hrs. |
| 2 | NMP | Gel dissolved in 6.2 hrs. |
| 3 | DMAc | Gel dissolved in 7.2 hrs. |
| a | DMSO | Gel softened; broke into small pieces; ⅔ dissolved in 24 hrs. |
| b | $CH_2Cl_2$ | Gel swelled twofold but did not dissolve in 24 hours. |
| c | iPrOH | Gel swelled slightly but did not dissolve in 24 hours. |
| d | MeOH | Gel did not swell or dissolve in 24 hrs. |
| e | Acetone | Gel did not swell or dissolve in 24 hrs. |

The use of 100% DMAc solvent (i.e., without any DBA) also was completely ineffective in dissolving gel.

Based on the above-described results, a 5 weight percent solution of DBA in DMAc was selected for cleaning the equipment described in Example 1. The solution was circulated through the equipment at a temperature of about 50° C. for 6 hours. The deposits were successfully removed from the equipment.

We claim:

1. An improved process for making a polymeric material which comprises mixing reactants, optionally in the presence of a solvent, to form a liquid reactant stream, heating the stream and providing sufficient reaction time to form the polymeric material, wherein the improvement comprises rapidly heating the reactant stream in a microwave resonant cavity operating with microwave energy producing a $TM_{0n0}$ mode with minimum heating at radial boundaries of the stream, and continuing the reaction as the stream advances substantially in plug flow through an annular zone of a volume controlled to provide a total residence time from the time the reactant stream enters the microwave cavity until the time product is removed from the annular zone that is constant and independent of mass-flow.

2. A process in accordance with claim 1 wherein the reactants are a substantially linear polymeric diol and an organic diisocyanate, the reactants are heated in the microwave cavity to a temperature in the range of 50° to 75° C. with energy supplied in a $TM_{020}$ mode, and then passed through the annular zone with a constant residence time in the range of 1 to 2½ hours, during which time the stream temperature rises to a temperature in the range of 80° to 100° C. and isocyanate-capped glycol is formed.

3. A process in accordance with claim 2 wherein the constant residence time is provided by adjusting the mass of liquid reactant stream in the annular zone in proportion to the mass flow rate in the reactor.

4. A process in accordance with claim 1 wherein the constant residence time is provided by adjusting the mass of liquid reactant stream in the annular zone in proportion to the mass flow rate in the reactor.

\* \* \* \* \*